No. 653,320. Patented July 10, 1900.
C. T. SEWELL.
SCRAPER.
(Application filed Nov. 16, 1899.)

(No Model.)

Witnesses
Harry L. Ames
Rexford M. Smith

Inventor
Charles T. Sewell.
By V. D. Stockbridge.
His Attorney

UNITED STATES PATENT OFFICE.

CHARLES T. SEWELL, OF SARGENT, GEORGIA.

SCRAPER.

SPECIFICATION forming part of Letters Patent No. 653,320, dated July 10, 1900.

Application filed November 16, 1899. Serial No. 737,166. (No model.)

*To all whom it may concern:*

Be it known that I, CHARLES T. SEWELL, a citizen of the United States, residing at Sargent, in the county of Coweta and State of Georgia, have invented a certain new and useful Scraper, of which the following is a specification, reference being had therein to the accompanying drawings.

This invention relates to cotton-scrapers or devices for cutting the weeds between the rows of cotton, corn, or other like crops.

The invention consists in certain combinations hereinafter described and claimed.

Figure 1:
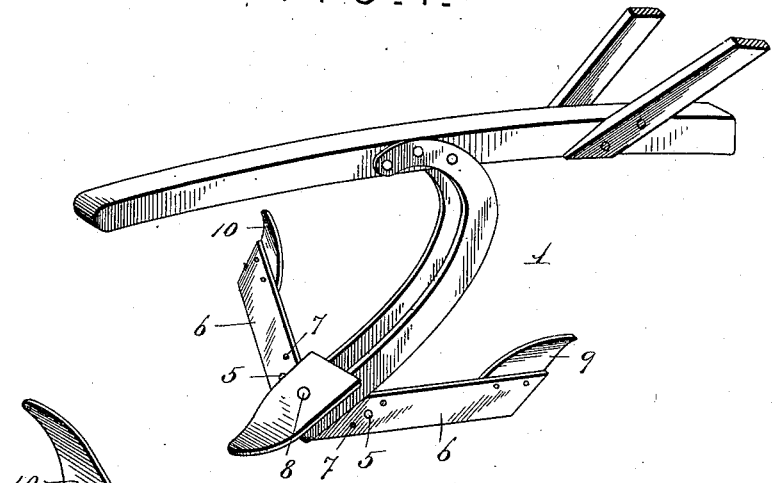
Figure 2:
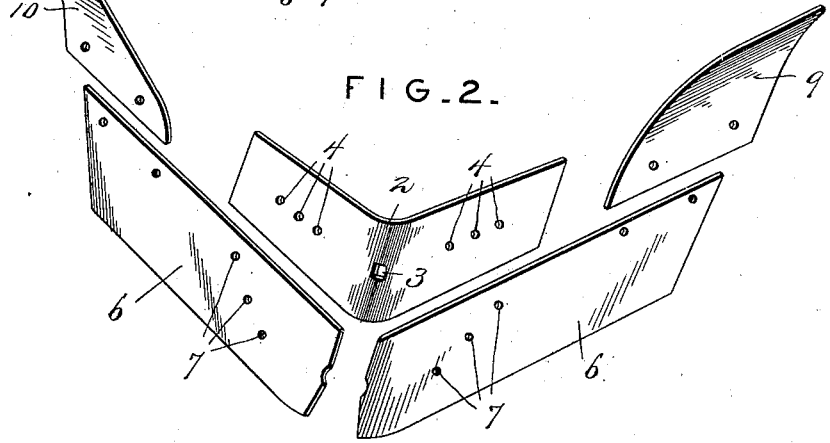
Figure 3:
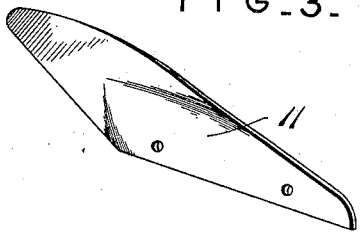

In the drawings, Figure 1 is a perspective of a plow with my improved scraper attached. Fig. 2 is also a perspective of the parts of the scraper ready for attachment with each other. Fig. 3 is a detail perspective of a modified form of indicator or guard attachment.

1 is a plow of conventional character to which my improved scraper is attached. The scraper consists of a central angular piece 2, provided with a countersunk square hole 3 in the middle part and with a series of holes 4 4 4 in each of the wings. Connected with the central angular piece 2 by means of bolts 5 are a pair of blades 6 6. These blades are each provided with a series of holes 7 7 7, arranged in different planes for the adjustment of the blades up and down, so as to provide for deep or shallow work, as may be desired. The holes in these blades are countersunk on the upper surface, so as to provide a smooth working surface for the scraper. The blades are each provided with an elongated notch at their meeting ends or edges, so as to permit of the adjustment up and down of said blades around the heel-bolt 8, which secures the scraper to the plow-foot. The heel-bolt 8 in securing the scraper clamps the blades between the central angular part 2 and the plow or plow-foot, as the case may be, and holds them at the proper angle with each other.

In making my improved scraper I have found that the best angle for the blades is about forty-three and one-half degrees and that the incline of the blades from bottom to top should be about forty-one degrees. By reason of my construction I am enabled to adjust and maintain the blades at the desired angles when the same are adjusted for deep or shallow work. Moreover, the blades may be removed and sharpened and readjusted without changing the set of them.

9, 10, and 11 are attachments of different forms for connection with the blades, the attachment on one side serving as an indicator or gage and also to protect the plants from the ends of the blades and operates to push the weeds and grass off from the row. The attachment on the right is curved on the edge and passes around the plants without doing any damage to them. The one on the left blade is used to cover up weeds or grass, as the case may be.

By reason of my construction the blades can be kept at the proper set, notwithstanding they are removed from time to time for sharpening or for adjustment. This is an important characteristic in scrapers, it being a well-known fact that large numbers of scrapers are annually thrown away because they have become distorted or have lost their proper set.

Having described my invention, what I claim as new, and desire to secure by Letters Patent, is—

1. The combination of a central angular piece, provided with a rectangular hole in the middle part thereof and a series of holes in its wings, a pair of blades each provided with an elongated notch at their meeting ends and with a series of holes in different planes, and means, as bolts, for coupling the blades and the angular piece together, substantially as described.

2. A scraper involving the combination of a central angular plate having a rectangular hole and a series of holes in each of its wings, a pair of blades each having an elongated notch at their meeting edges and a plurality of holes in different planes, means for clamping the angular piece and the blades together, and curved attachments connected with the blades, substantially as described.

In testimony whereof I affix my signature in presence of two witnesses.

CHARLES T. SEWELL.

Witnesses:
  J. N. SEWELL,
  W. T. DYER.